(12) United States Patent
Uki et al.

(10) Patent No.: US 12,420,652 B2
(45) Date of Patent: Sep. 23, 2025

(54) CONNECTION TERMINAL

(71) Applicant: Yazaki Corporation, Tokyo (JP)

(72) Inventors: Kazutaka Uki, Kakegawa (JP); Takahiro Syouda, Susono (JP); Kenji Yamada, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 655 days.

(21) Appl. No.: 17/873,729

(22) Filed: Jul. 26, 2022

(65) Prior Publication Data

US 2023/0031879 A1 Feb. 2, 2023

(30) Foreign Application Priority Data

Jul. 28, 2021 (JP) .................. 2021-123578

(51) Int. Cl.
*H01R 13/02* (2006.01)
*B60L 53/16* (2019.01)
*B60L 53/18* (2019.01)
*B60L 53/302* (2019.01)
*H01R 13/502* (2006.01)
*H01R 13/52* (2006.01)

(52) U.S. Cl.
CPC ............... *B60L 53/16* (2019.02); *B60L 53/18* (2019.02); *H01R 13/502* (2013.01); *H01R 13/521* (2013.01)

(58) Field of Classification Search
CPC ........ B60L 53/16; B60L 53/18; B60L 53/302; H01R 13/502; H01R 13/521; H01R 43/16; H01R 13/02; Y02E 60/14; Y02T 10/70; Y02T 10/7072; Y02T 90/14
See application file for complete search history.

(56) References Cited

U.S. PATENT DOCUMENTS

| 10,675,988 | B2 * | 6/2020 | Fuehrer | ................... B60L 53/16 |
| 2019/0344674 | A1 | 11/2019 | Arai | |
| 2020/0080901 | A1 * | 3/2020 | Myer | ....................... G01K 5/62 |

FOREIGN PATENT DOCUMENTS

| JP | 2003-035495 A | 2/2003 | |
| JP | 2019-197641 A | 11/2019 | |
| JP | 2020-187920 A | 11/2020 | |
| WO | WO-2014077196 A1 * | 5/2014 | ............. H01R 13/08 |
| WO | 2020/053739 A1 | 3/2020 | |

* cited by examiner

*Primary Examiner* — Nghia M Doan
(74) *Attorney, Agent, or Firm* — Sughrue Mion, PLLC

(57) ABSTRACT

A connection terminal includes a terminal connecting portion configured to be electrically connected to a counterpart terminal, an electric wire connecting portion configured to be electrically connected to an electric wire, a holding portion provided between the terminal connecting portion and the electric wire connecting portion and configured to be held by a housing, a sealed space formed in the holding portion, a latent heat storage material and a gas sealed in the sealed space, a sealing hole communicating the sealed space with a space outside the connection terminal, and a plug member configured to block the sealing hole.

3 Claims, 13 Drawing Sheets

CONNECTION TERMINAL

CROSS-REFERENCE TO RELATED APPLICATION

The present application claims priority to Japanese Patent Application No. 2021-123578 filed on Jul. 28, 2021, the entire content of which is incorporated herein by reference.

TECHNICAL FIELD

The present invention relates to a connection terminal.

BACKGROUND

In the related art, a connector (charging inlet) disposed in a vehicle such as an electric vehicle or a plug-in hybrid vehicle has been used to supply (charge) electric power from outside of the vehicle to a battery mounted on the vehicle. With the connector, an increase in current is required to increase the capacity of a mounted power storage device, shorten the charging time, and the like. However, when the current increases, the temperature of the connector increases due to heat generated at a terminal connecting portion of the connector due to energization. Therefore, in connectors including a terminal connecting portion, such as a charging inlet, a connector that can prevent a temperature rise during energization has been proposed (for example, see JP2019-197641A and JP2020-187920A).

The connector disclosed in a related art mentioned above includes a terminal having a base portion connected to an electric wire and a tubular portion extending away from the base portion and having an outer peripheral surface that comes into contact with a counterpart terminal of a counterpart connector. A heat transfer member (latent heat storage material) is sealed in an enclosed space (sealed space) defined by an inner peripheral surface of the tubular portion. The heat transfer member absorbs, from the tubular portion, a part of heat generated at the tubular portion during conduction between the terminal and the counterpart terminal, and transports the absorbed heat to the base portion. Therefore, a temperature rise of a heat generating portion of the terminal can be effectively prevented.

The connector disclosed in another related art mentioned above includes a terminal having a holding portion formed integrally with a terminal connecting portion and an electric wire connecting portion, and a heat storage body held by the holding portion. The heat storage body includes a heat storage material (latent heat storage material) accommodated inside a case (sealed space) held by the holding portion. The heat storage material can absorb heat generated in the terminal. Therefore, a rapid temperature rise of the terminal can be prevented.

However, in order to seal the heat transfer member in the enclosed space of the terminal in the connector disclosed in the former related art, the base portion or a blocked portion needs to be joined to an opening end of the bottomed tubular portion to be blocked after the heat transfer member is accommodated in the tubular portion, making it difficult to seal the heat transfer member. Further, in order to hold the heat storage material in the holding portion of the terminal in the connector disclosed in the latter related art, a cover needs to be welded and fixed to block an opening of a bottomed tubular case main body after the heat storage material is accommodated in the case main body, making it difficult to seal the heat storage material.

SUMMARY

Illustrative aspects of the presently disclosed subject matter provide a connection terminal in which a latent heat storage material is easily sealed in a sealed space of the terminal.

According to an illustrative aspect of the presently disclosed subject matter, a connection terminal includes a terminal connecting portion configured to be electrically connected to a counterpart terminal, an electric wire connecting portion configured to be electrically connected to an electric wire, a holding portion provided between the terminal connecting portion and the electric wire connecting portion and configured to be held by a housing, a sealed space formed in the holding portion, a latent heat storage material and a gas sealed in the sealed space, a sealing hole communicating the sealed space with a space outside the connection terminal, and a plug member configured to block the sealing hole.

Other aspects and advantages of the presently disclosed subject matter will be apparent from the following description, the drawings and the claims.

DESCRIPTION OF EMBODIMENTS

A specific embodiment according to the present invention will be described below with reference to the drawings.

A charging inlet 1 including a terminal 10 that is a connection terminal according to an embodiment of the present invention is a connector disposed in a vehicle such as a plug-in hybrid vehicle or an electric vehicle and connected to an electric wire extending from a battery mounted on the vehicle. When a counterpart connector (so-called charging gun) is fitted into a fitting concave portion 63 (see FIG. 1 and the like) of the charging inlet 1, electric power is supplied to the battery from outside of the vehicle and the battery is charged.

Figure 1:
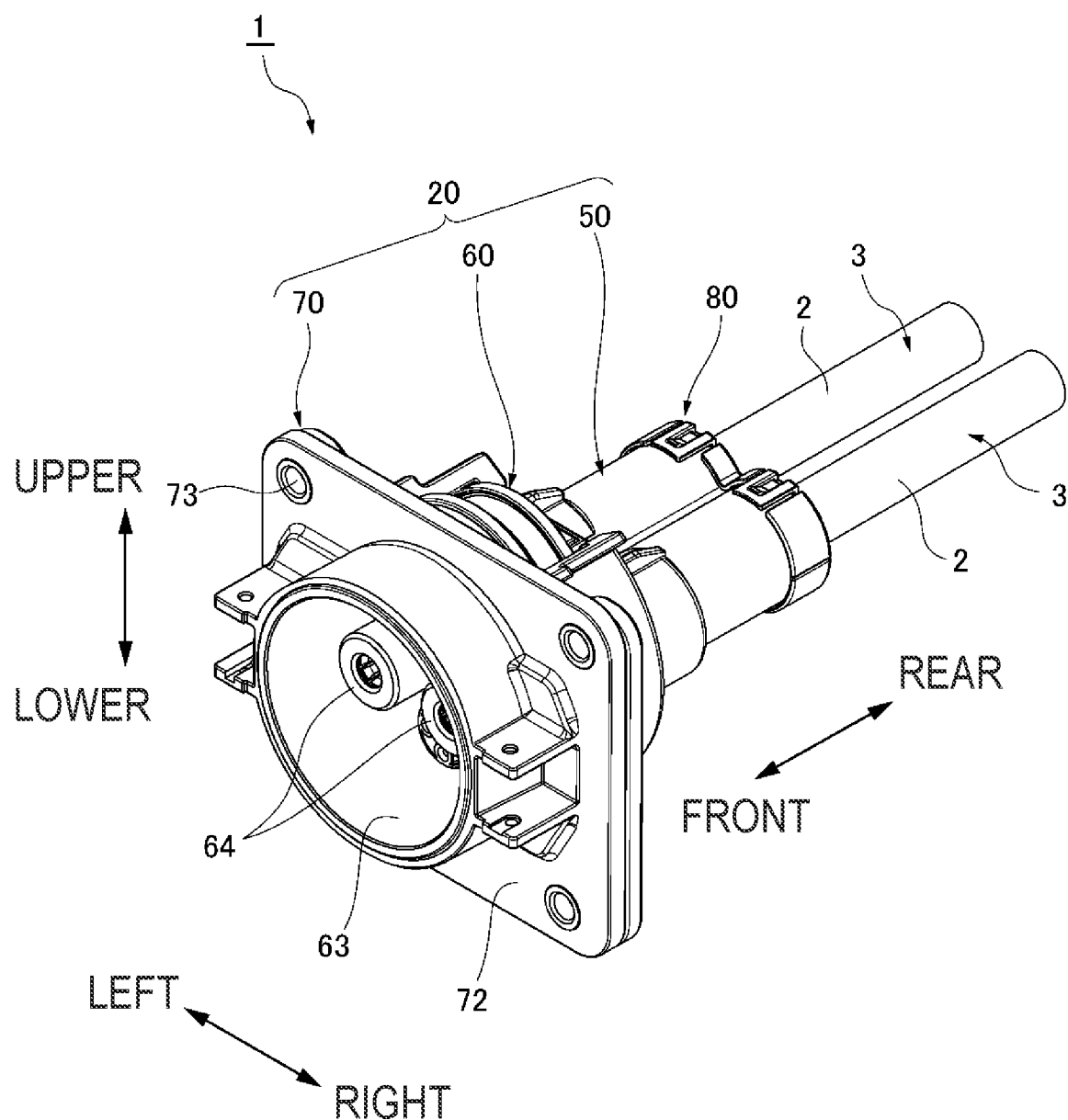
FIG. 1 is an overall perspective view of a charging inlet including a connection terminal according to an embodiment of the present invention.

Hereinafter, for convenience of description, a "front-rear direction", a "left-right direction", and an "upper-lower direction" are defined as illustrated in FIG. 1. The "front-rear direction", a "width direction", and the "upper-lower direction" are orthogonal to one another. The front-rear direction coincides with the fitting direction of the charging inlet 1 and the counterpart connector (not illustrated), and a front side (side approaching counterpart connector) in the fitting direction as viewed from the charging inlet 1 is referred to as the "front side", and a side (side away from the counterpart connector) on which the fitting is released as viewed from the charging inlet 1 is referred to as a "rear side".

As illustrated in FIGS. 1 to 5, the charging inlet 1 includes a pair of terminals (connection terminals) 10 and a housing 20 that houses the pair of terminals 10. The pair of terminals 10 are respectively connected to one end portions of a pair of electric wires 2 to form a pair of terminal-attached electric wires 3. The other end portions of the pair of electric wires 2 are connected to the battery (not illustrated). The electric wire 2 includes a conductor core wire 2a and a coating 2b covering the conductor core wire 2a (see FIG. 5). The coating 2b is made of an insulating resin. Hereinafter, components constituting the charging inlet 1 will be described in order.

Figure 5:
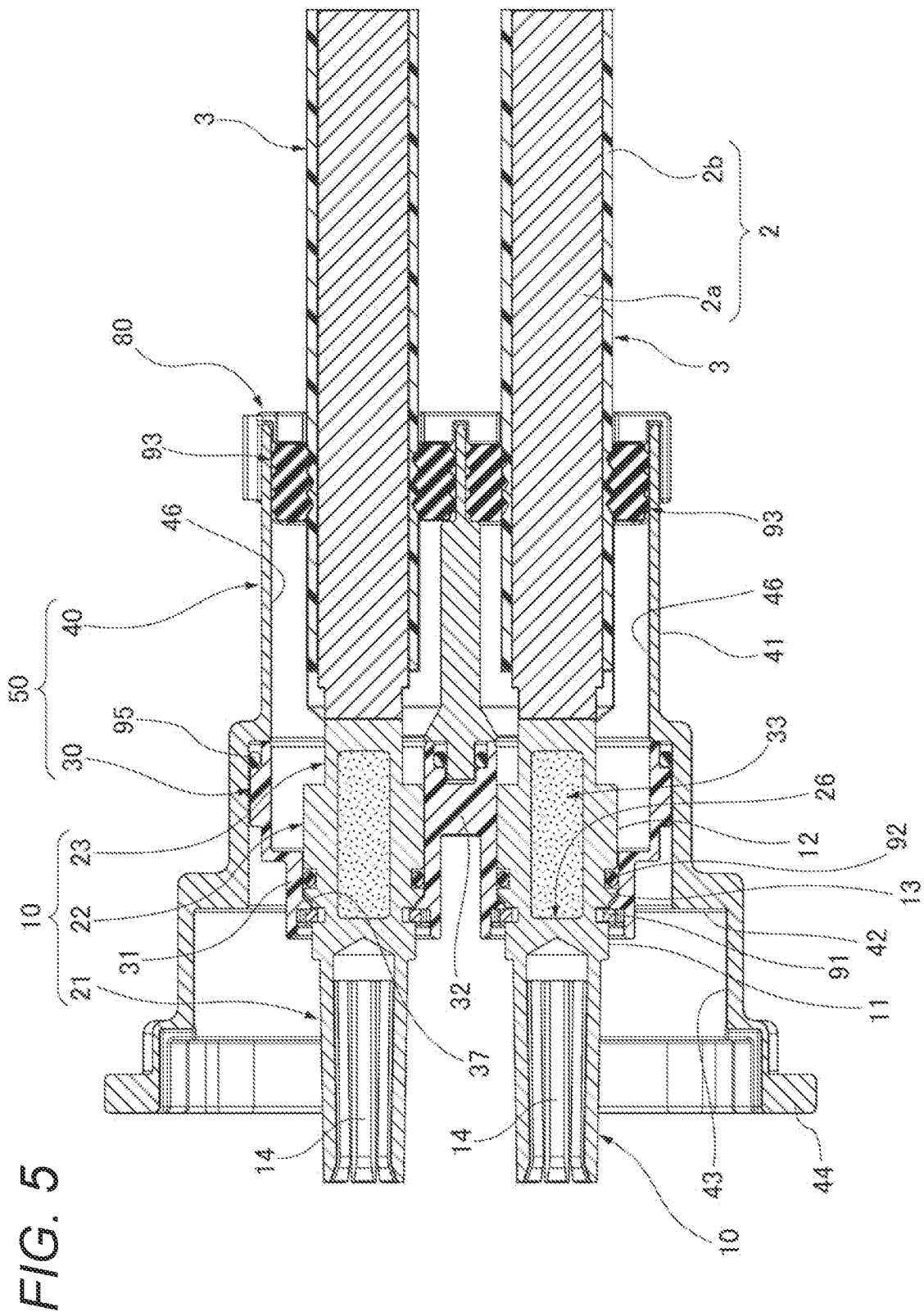
FIG. 5 is a cross-sectional view taken along a line A-A in FIG. 2.

First, the housing 20 will be described. In the present embodiment, as illustrated in FIGS. 1, 5, and the like, the housing 20 includes a base holder 50, an inner housing main body 60, and an outer housing main body 70. Each of the base holder 50, the inner housing main body 60, and the outer housing main body 70 is a frame component of the housing 20, and constitutes a part of an outer surface of the housing 20. Hereinafter, components constituting the housing 20 will be described in order. The "frame component" of the housing 20 refers to, for example, a component having sufficient hardness and strength to maintain the shape of the housing 20 so that the position of the terminal 10 is held against an external force applied to the terminal 10 when the terminal 10 and the counterpart terminal (not illustrated) are fitted. In other words, the "frame component" refers to a component made of a material that does not cause softening, embrittlement, or the like to such an extent that it is difficult to maintain the shape due to an increase in the operating temperature of the terminal 10.

Figure 4:
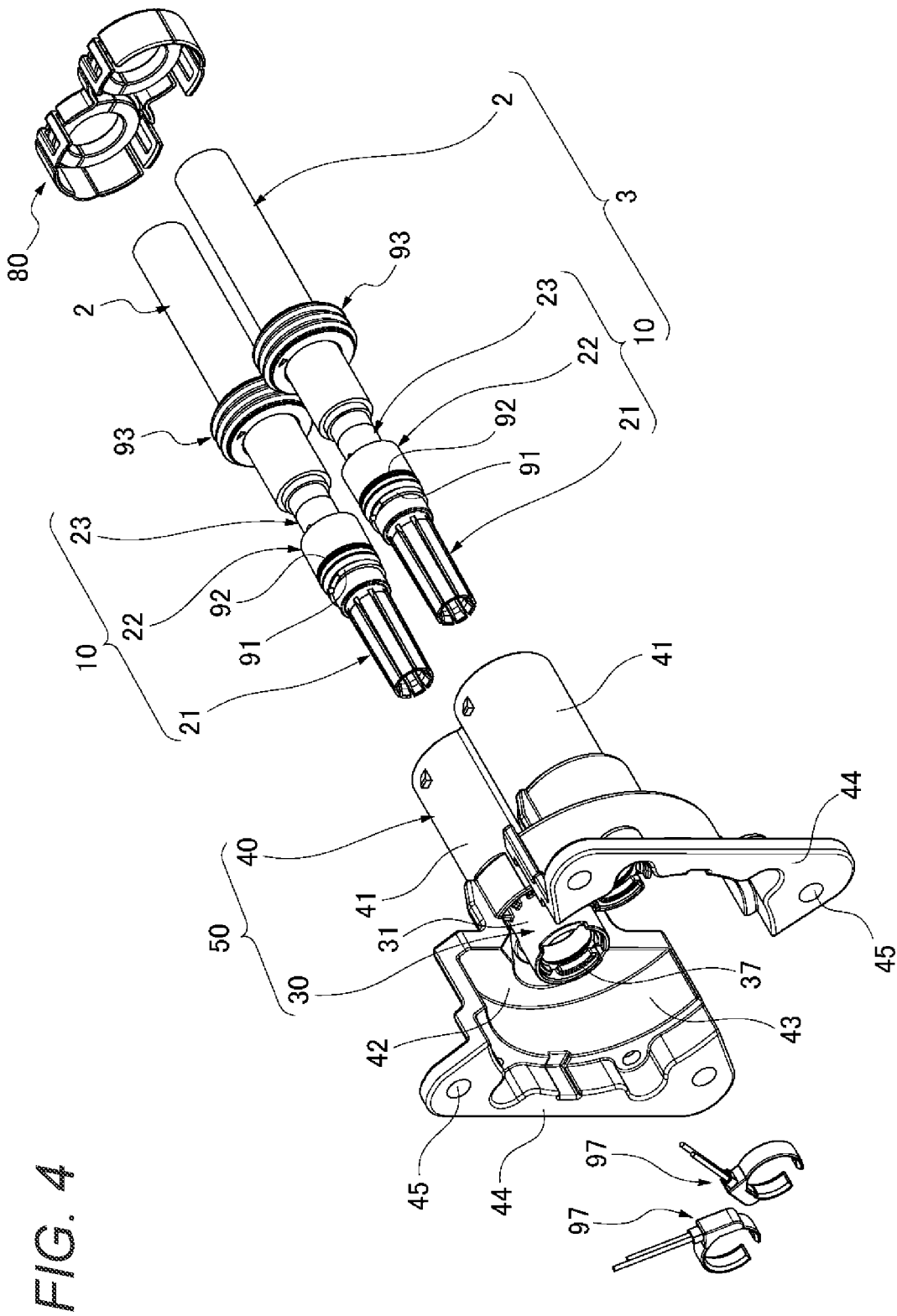
FIG. 4 is a perspective view illustrating a state in which a terminal-attached electric wire is disassembled from a base holder illustrated in FIG. 3.

The base holder 50 has a function of holding the pair of terminals 10 in a state in which the terminals 10 are insulated from each other at an interval in the left-right direction. As illustrated in FIGS. 4 and 5, the base holder 50 integrally includes a resin holder 30 having a pair of terminal holding portions 31 arranged in the left-right direction, and a metal holder 40 covering an outer peripheral surface of the resin holder 30.

As illustrated in FIG. 5, the terminal holding portion 31 of the resin holder 30 has a stepped cylindrical shape extending in the front-rear direction. The pair of terminal holding portions 31 are coupled by a coupling portion 32. The pair of terminals 10 are inserted into internal spaces of the pair of terminal holding portions 31 from the rear side. As illustrated in FIG. 5, the terminal holding portion 31 is formed with, on an inner wall surface of a front end portion thereof, an annular locking protrusion 37 protruding radially inward. The annular locking protrusion 37 corresponds to a step portion 13 of the terminal 10.

As illustrated in FIGS. 4 and 5, the metal holder 40 includes a tubular portion 41 extending in the front-rear direction. A front part of the tubular portion 41 has an inner peripheral shape corresponding to an outer peripheral shape of the resin holder 30, and can be installed from a rear side of the resin holder 30 in a manner of covering outer peripheral surfaces of the pair of terminal holding portions 31 and an outer peripheral surface of the coupling portion 32 coupling the terminal holding portions 31 in the left-right direction. Water is prevented by an O-ring 95 between an outer peripheral surface of a rear end of the terminal holding portion 31 and an inner peripheral surface of the metal holder 40.

A rear part of the tubular portion 41 has a pair of electric wire through holes 46 arranged in the left-right direction and penetrating in the front-rear direction. The terminal 10 of the terminal-equipped electric wire 3 inserted from rearward of the electric wire through hole 46 is inserted into the terminal holding portion 31 of the resin holder 30. Water is prevented by a packing 93 between an outer peripheral surface of the electric wire 2 (coating 2b) inserted into the electric wire through hole 46 of the tubular portion 41 and an inner wall surface of the electric wire through hole 46. The packing 93 is retained by a rear holder 80 installed to a rear end of the tubular portion 41.

The tubular portion 41 is integrally provided with, at a front end portion thereof, a pair of extending portions 42 extending outward in the left-right direction from respective side portions of the front end portion in the left-right direction, and a pair of side wall portions 43 extending forward from respective extending end portions of the pair of extending portions 42. The pair of side wall portions 43 each have a shape corresponding to a circumferential part of an outer peripheral shape (cylindrical shape) of a cylindrical portion 61 (see FIG. 3), which will be described later, of the inner housing main body 60 when viewed in the front-rear direction, and can be installed to the cylindrical portion 61 in a manner of covering an outer peripheral surface of a rear end portion of the cylindrical portion 61.

Figure 3:
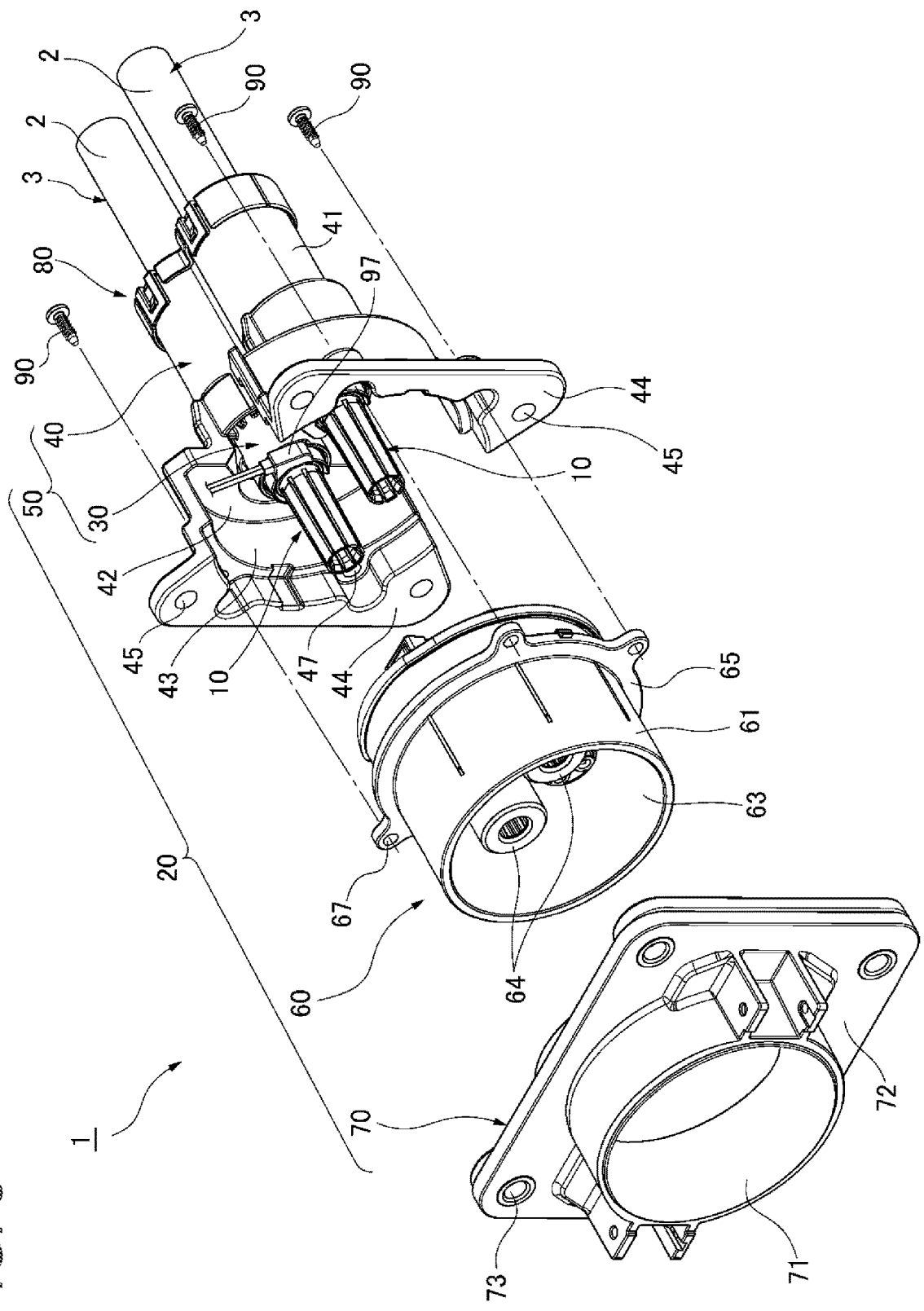
FIG. 3 is an exploded perspective view of the charging inlet illustrated in FIG. 1.

As illustrated in FIG. 3, the pair of side wall portions 43 are provided with, on outer peripheral surfaces (outer side surfaces in the left-right direction) thereof, bolt insertion portions 44 in a plurality of positions (four positions in the present embodiment). Each of the bolt insertion portions 44 is formed with a bolt through hole 45 penetrating in the front-rear direction. A bolt (not illustrated) for assembling the charging inlet 1 is inserted into the bolt through hole 45. The metal holder 40 of the base holder 50 is made of metal, the resin holder 30 is assembled from the front side, and functions to absorb and dissipate heat generated in the pair of terminals 10.

Figure 2:
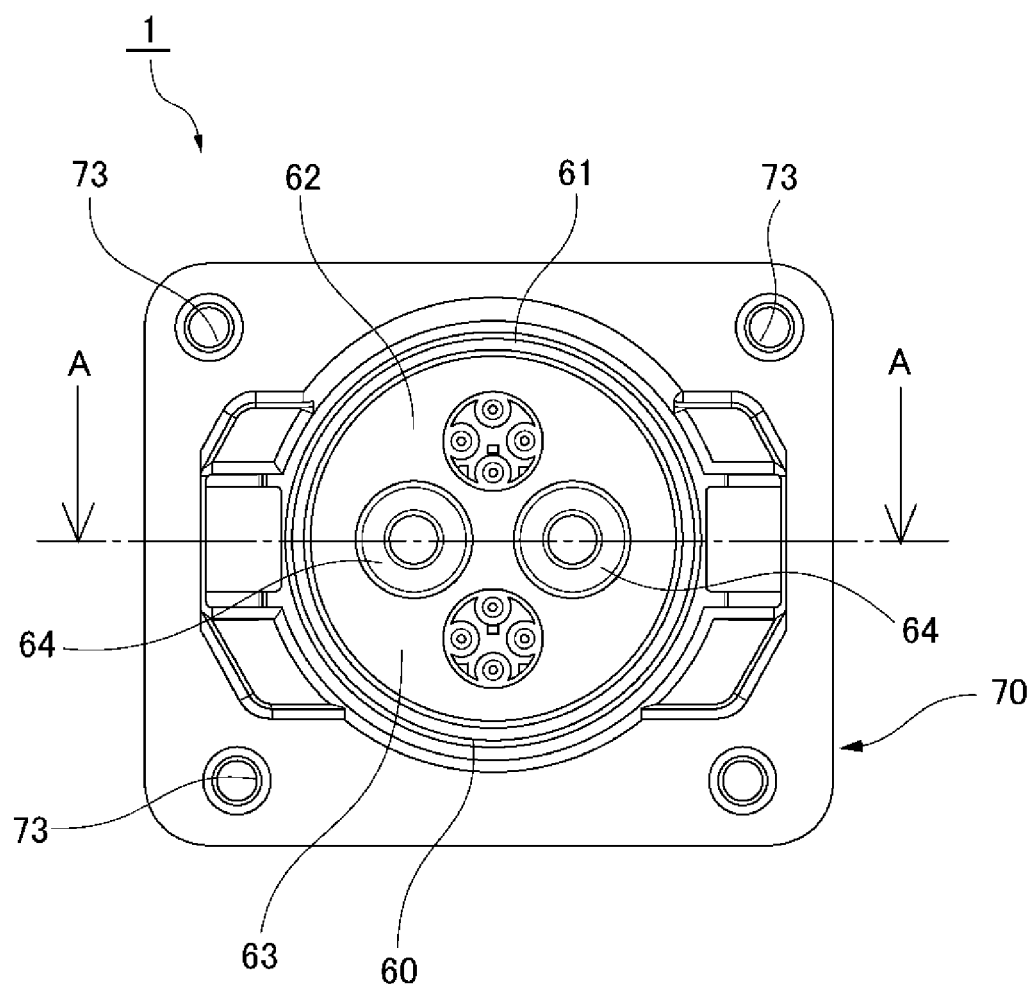
FIG. 2 is a front view of the charging inlet illustrated in FIG. 1.

Next, the inner housing body 60 will be described. As illustrated in FIGS. 1 to 3, the inner housing body 60 is assembled between the pair of side wall portions 43 of the base holder 50 from the front side, and defines the fitting concave portion 63 of the charging inlet 1. The inner housing body 60 is a resin molded product and integrally includes the cylindrical portion 61 extending in the front-rear direction and a rear wall portion 62 blocking a rear opening of the cylindrical portion 61. The cylindrical portion 61 and the rear wall portion 62 define the fitting concave portion 63 that opens forward and is recessed rearward.

The rear wall portion 62 is provided with a pair of cylindrical female terminal accommodating portions 64 corresponding to terminal connecting portions 21 of the pair of terminals 10. The female terminal accommodating portions 64 protrude forward. The female terminal accommodating portion 64 is located in the fitting concave portion 63 and has an internal space penetrating in the front-rear direction.

As illustrated in FIG. 3, the cylindrical portion 61 is provided with, in a position rearward of a center in the front-rear direction on an outer peripheral surface of the cylindrical portion 61, an annular flange portion 65 protruding outward in a radial direction of the cylindrical portion 61. The flange portion 65 is formed with bolt through holes 67 penetrating in the front-rear direction in a plurality of positions (four positions in the present embodiment) in a circumferential direction. The bolt through holes 67 correspond to a plurality of bolt through holes 47 of the metal holder 40. Screws 90 for assembling the inner housing main body 60 are inserted into the bolt through holes 67.

Next, the outer housing body 70 will be described. The outer housing main body 70 is assembled to the cylindrical portion 61 of the inner housing main body 60 from the front side, and can fix, together with the metal holder 40, the entire housing 20 to an attachment target portion (not illustrated) of the charging inlet 1 provided in the vehicle. The outer housing main body 70 is a resin molded product and includes a cylindrical portion 71 extending in the front-rear direction. The cylindrical portion 71 is installable to the cylindrical portion 61 from the front side in a manner of covering an outer peripheral surface of the cylindrical portion 61 of the inner housing main body 60 (see FIGS. 1 to 3).

As illustrated in FIG. 3, the cylindrical portion 71 is provided with, in a position rearward of a center in the front-rear direction on an outer peripheral surface of the cylindrical portion 71, an annular flange portion 72 protruding outward in a radial direction of the cylindrical portion 71. The flange portion 72 has a rectangular outer peripheral shape when viewed in the front-rear direction. The flange portion 72 is formed with a bolt through hole 73 penetrating in the front-rear direction in each of four corners thereof. An assembly bolt (not illustrated) for fixing the charging inlet 1 to the attachment target portion is inserted into the bolt through hole 73.

Figure 6:
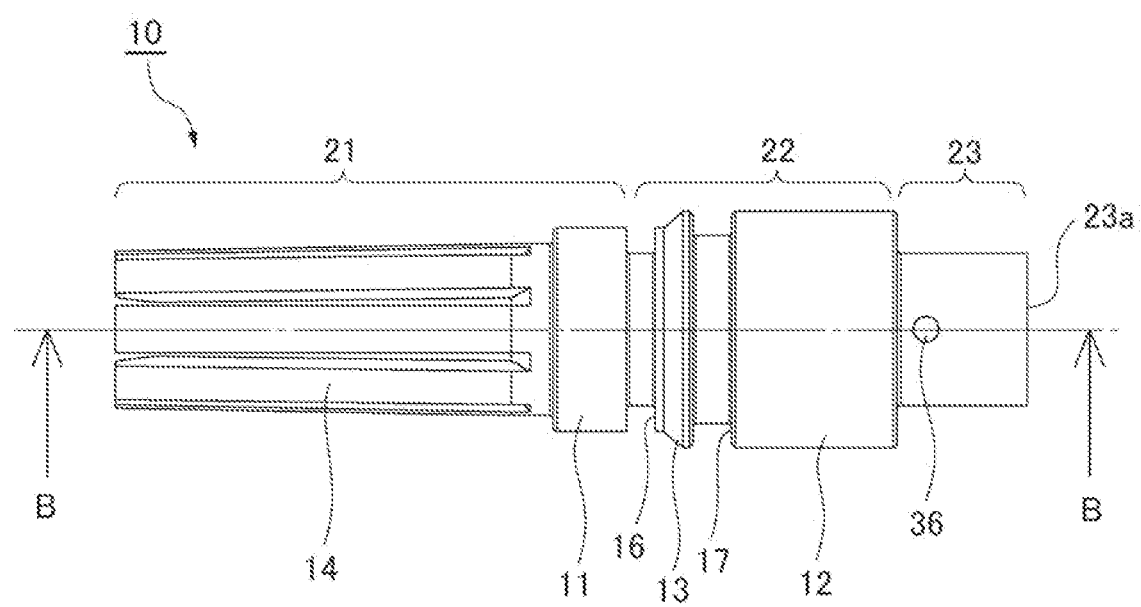
FIG. 6 is a top view of the connection terminal illustrated in FIG. 4.
Figure 7:
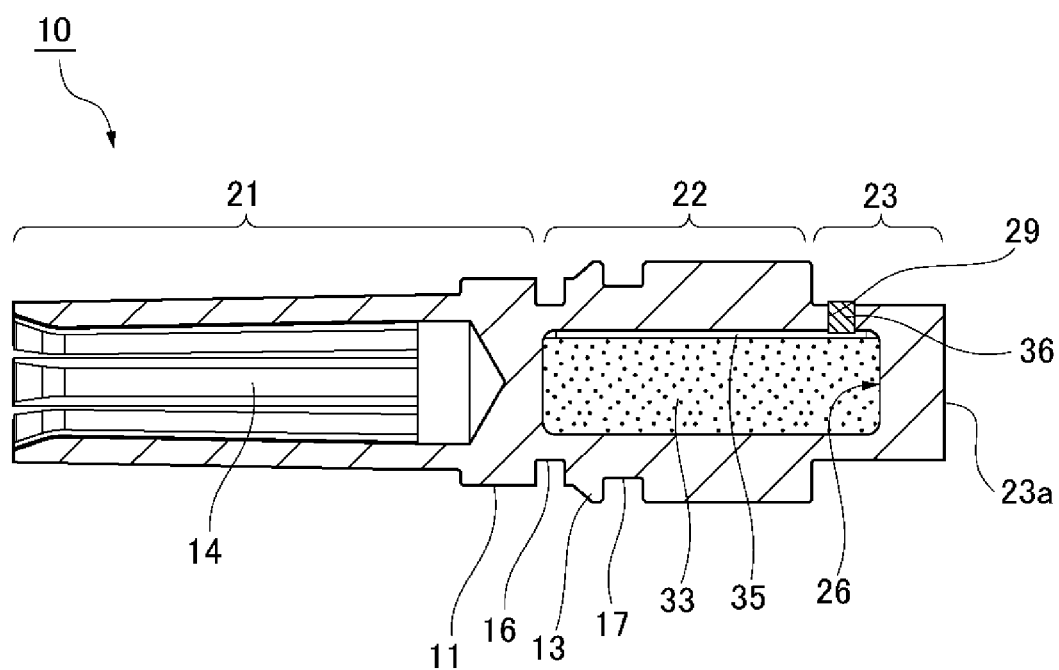
FIG. 7 is a cross-sectional view taken along a line B-B of FIG. 6.

Next, the pair of terminals 10 that are connection terminals according to the present embodiment will be described. In the present embodiment, the pair of terminals 10 have the same shape. The terminal 10 is made of metal, and as illustrated in FIGS. 6 and 7, includes the terminal connecting portion 21 on one end side, which is electrically connected to the counterpart terminal (male terminal), and an electric wire connecting portion 23 on the other end side, which is electrically connected to the electric wire 2. A holding portion 22 held by the housing 20 is provided between the terminal connecting portion 21 and the electric wire connecting portion 23.

The terminal connecting portion 21 is a female terminal portion including a small diameter portion 11 and a plurality of elastic contact pieces 14 forward of the small diameter portion 11. Each of the plurality of resilient contact pieces 14 has a substantially cylindrical shape, and is inserted into the counterpart terminal (male terminal). The terminal connecting portion 21 of the present embodiment is not limited to the female terminal portion, and may be a male terminal portion.

A thermistor 97 is installed on an outer peripheral surface of the small diameter portion 11 (see FIG. 3). Accordingly, the temperature of the terminal 10 can be measured, and the transition of the temperature of the terminal 10 during use of the charging inlet 1 (during use of the battery) can be monitored.

The electric wire connecting portion 23 has a short solid columnar shape, and the conductor core wire 2a of the electric wire 2 is joined to an end surface 23a by thermal pressure welding. The end surface 23a of the electric wire connecting portion 23 may be provided with a concave portion, and the conductor core wire 2a exposed at one end portion of the electric wire 2 may be inserted and crimped.

The holding portion 22 includes a stepped cylindrical portion including a large diameter portion 12 located rearward of the small diameter portion 11 and the annular step portion 13 formed at a boundary portion between the small diameter portion 11 and the large diameter portion 12. The step portion 13 is locked to the locking protrusion 37 (see FIG. 5) of the resin holder 30.

As illustrated in FIGS. 6 and 7, an annular groove 16 is formed in the outer peripheral surface of the small diameter portion 11 in the vicinity of the step portion 13, and an annular groove 17 is formed on the outer peripheral surface of the large diameter portion 12 in the vicinity of the step portion 13. A C-ring 91 (see FIGS. 4 and 5) for fixing the terminal is installed in the annular groove 16. An O-ring 92 (see FIGS. 4 and 5) is installed in the annular groove 17.

The terminal 10 is held by the base holder 50 when the large diameter portion 12 is inserted into the terminal holding portion 31 of the resin holder 30. That is, when the terminal 10 inserted from rearward of the electric wire through hole 46 in the metal holder 40 is inserted into the terminal holding portion 31 of the resin holder 30 from the rear side, the small diameter portion 11 and the plurality of elastic contact pieces 14 of the terminal 10 protrude from a front end of the terminal holding portion 31 to the front side, and the step portion 13 of the terminal 10 is locked to the locking protrusion 37 of the terminal holding portion 31.

When the insertion of the terminal 10 into the base holder 50 is completed, as illustrated in FIG. 5, the C-ring 91 installed in the terminal 10 is locked to the locking protrusion 37, whereby the terminal 10 is prevented from falling off from the base holder 50. Further, the O-ring 92 installed in the terminal 10 is pressed and brought into contact with the inner wall surface of the terminal holding portion 31, so that water is prevented between the resin holder 30 and the terminal 10 by the O-ring 92.

Further, the terminal 10 according to the present embodiment has a cylindrical sealed space 26, which extends in the front-rear direction, at least in the holding portion 22. In the present embodiment, the sealed space 26 is defined in the holding portion 22 and a part of the electric wire connecting portion 23.

A cross-sectional area of the holding portion 22 in which the sealed space 26 is defined is larger than a cross-sectional area of the plurality of elastic contact pieces 14 of the terminal connecting portion 21. That is, the holding portion 22 in the structure of the terminal 10 is a portion that can ensure a sufficient cross-sectional energization area, and is sufficient to ensure the same heat capacity as a cross-sectional energization area of the terminal connecting portion 21. Therefore, even when the sealed space 26 is provided inside the terminal 10 made of a metal such as copper or aluminum, which is a sensible heat storage material, and the cross-sectional energization area is reduced, the thermal influence is considered to be slight.

A latent heat storage material 33 and a gas 35 are sealed in the sealed space 26. A sealing hole 29 that communicates the sealed space 26 with the outside of the terminal is formed in the outer peripheral surface of the electric wire connecting portion 23, and is blocked by a plug member 36. That is, the sealing hole 29 is blocked by the plug member 36 after the latent heat storage material 33 and the gas 35 are filled in the sealed space 26 from the sealing hole 29, whereby the latent heat storage material 33 and the gas 35 are sealed in the sealed space 26. The plug member 36 may be fixed to the sealing hole 29 by various fixing methods such as press-fitting, screwing, and welding.

The latent heat storage material 33 is a material that can temporarily absorb heat by latent heat during a phase change between liquid and solid. Examples of the latent heat storage material 33 include paraffin, sodium sulfate decahydrate, sodium acetate trihydrate, and vanadium dioxide. The gas 35 is a compressible gas to correspond to the latent heat storage material 33 that changes in phase between liquid and solid in the sealed space 26, and nitrogen gas or air can be used.

The terminal connecting portion 21 of one of the pair of terminals 10 functions as an anode side terminal, and the terminal connecting portion 21 of the other one of the pair of terminals 10 functions as a cathode side terminal. When the charging inlet 1 and the counterpart connector are fitted, the terminal connecting portion 21 of the one terminal 10 and the terminal connecting portion 21 of the other terminal 10 are respectively connected to an anode side male terminal portion and a cathode side male terminal portion of the counterpart connector.

Figure 8:
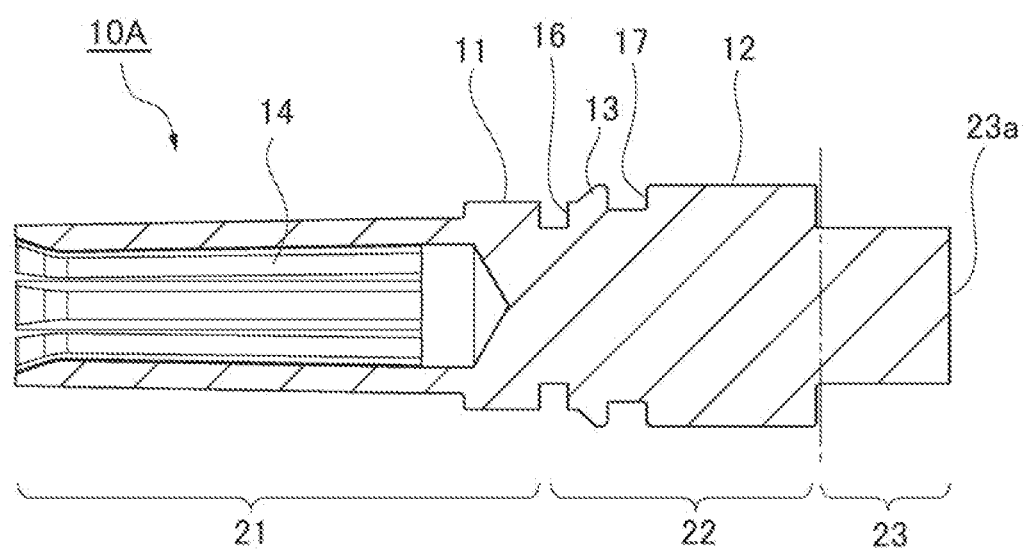
FIG. 8 is a longitudinal sectional view illustrating a primary molded product of the connection terminal according to the embodiment.

Next, a molding example of the sealed space 26 and the sealing hole 29 in the terminal 10 of the present embodiment will be described. First, as illustrated in FIG. 8, a primary molded product 10A of the terminal 10 having the terminal connecting portion 21 on one end side, the electric wire connecting portion 23 on the other end side, and the holding portion 22 between the terminal connecting portion 21 and the electric wire connecting portion 23 is formed. In the primary molded product 10A, the plurality of elastic contact pieces 14 and the small diameter portion 11 are cut into the terminal connecting portion 21, and the annular grooves 16, 17, the large diameter portion 12, and the step portion 13 are cut into the holding portion 22 (terminal cutting step).

Figure 9:
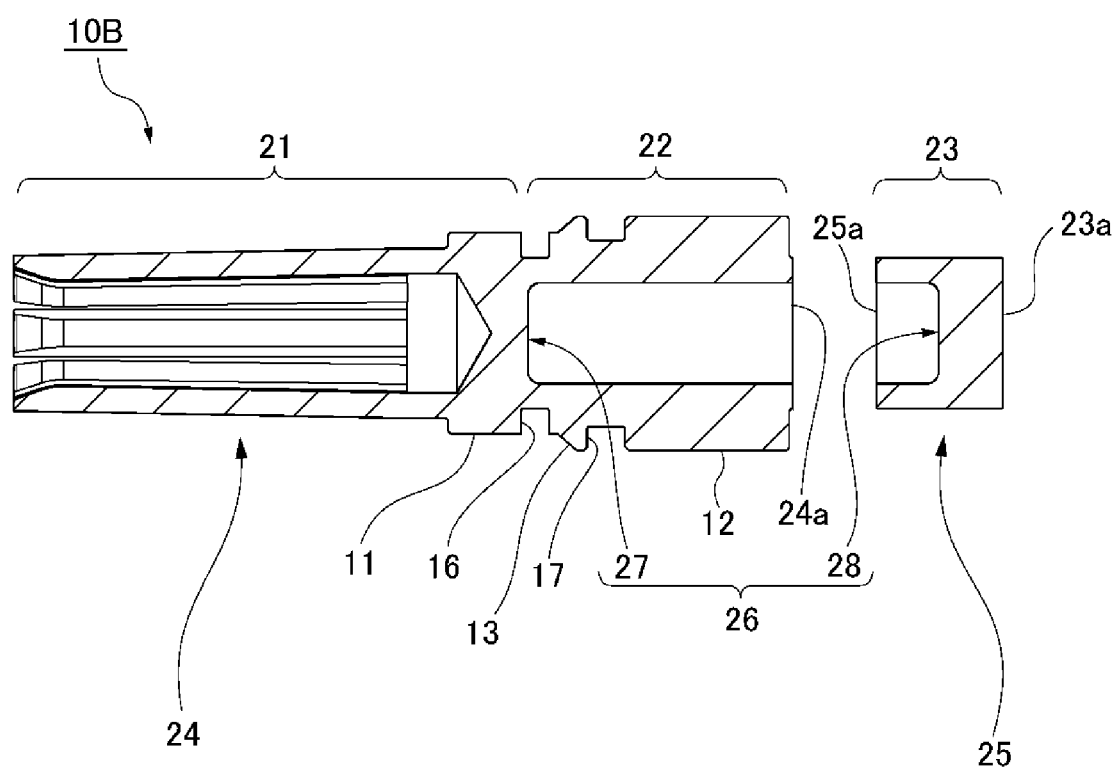
FIG. 9 is a longitudinal sectional view illustrating a secondary molded product of the connection terminal according to the embodiment.

Next, the primary molded product 10A is cut up along a two-dot chain line in FIG. 8 between the holding portion 22 and the electric wire connecting portion 23, and is divided into a first member 24 integrally formed with the terminal connecting portion 21 and a second member 25 integrally formed with the electric wire connecting portion 23 as illustrated in FIG. 9 (terminal cutting-up step).

A first concave portion 27 that defines the sealed space 26 is drilled forward in a cut-up surface 24a of the first member 24, and a second concave portion 28 that defines the sealed space 26 is drilled rearward in a cut-up surface 25a of the second member 25, whereby a secondary molded product 10B is formed (sealed space forming step).

Figure 10:
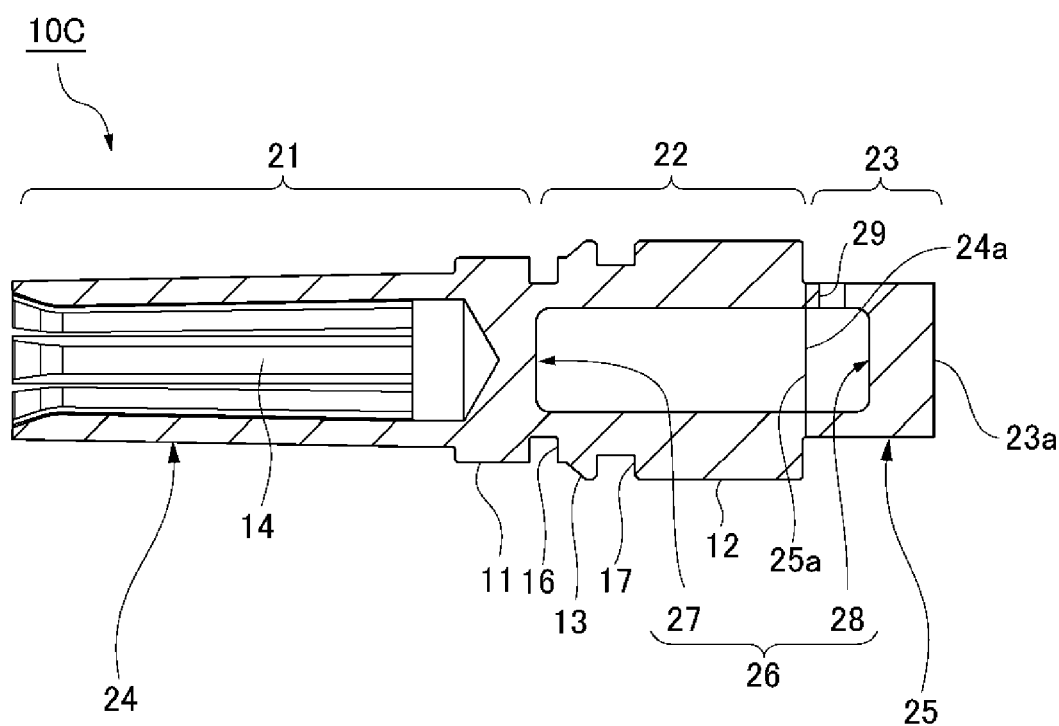
FIG. 10 is a longitudinal sectional view illustrating a tertiary molded product of the connection terminal according to the embodiment.

Next, as illustrated in FIG. 10, the sealing hole 29 communicating with the second concave portion 28 is drilled in an outer peripheral surface of the second member 25 having a smaller diameter than the large diameter portion 12 of the first member 24. Accordingly, a tertiary molded product 10C is formed (sealing hole forming step). Here, the sealing hole 29 is a through hole having a minimum size necessary for filling the latent heat storage material 33, and is, for example, a through hole having a size into which a filling nozzle for filling the latent heat storage material 33 into the sealed space 26 is insertable.

Figure 11:
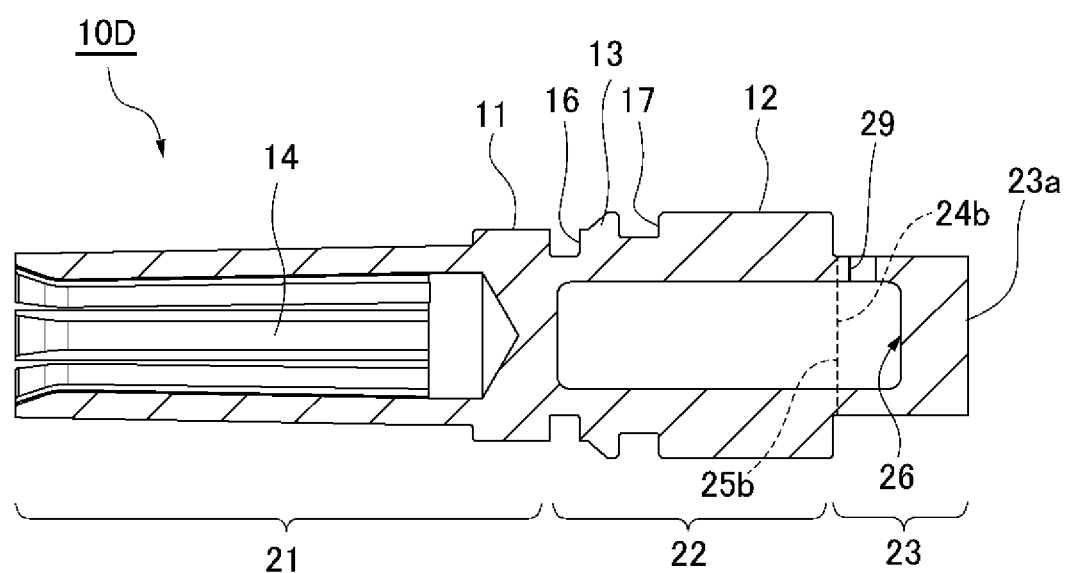
FIG. 11 is a longitudinal sectional view illustrating a quaternary molded product of the connection terminal according to the embodiment.

Then, the cut-up surface 24a of the first member 24 and the cut-up surface 25a of the second member 25 are butted against each other and joined by, for example, thermal pressure welding (thermal pressure welding), whereby the first member 24 and the second member 25 are integrated with each other (terminal joining step). Therefore, as illustrated in FIG. 11, a quaternary molded product 10D in which the sealed space 26 is defined by the first concave portion 27 of the first member 24 and the second concave portion 28 of the second member 25 is formed. Here, the cut-up surface 24a of the first member 24 and the cut-up surface 25a of the second member 25 are a joining surface 24b and a joining surface 25b that are thermally pressure-welded.

Figure 12:
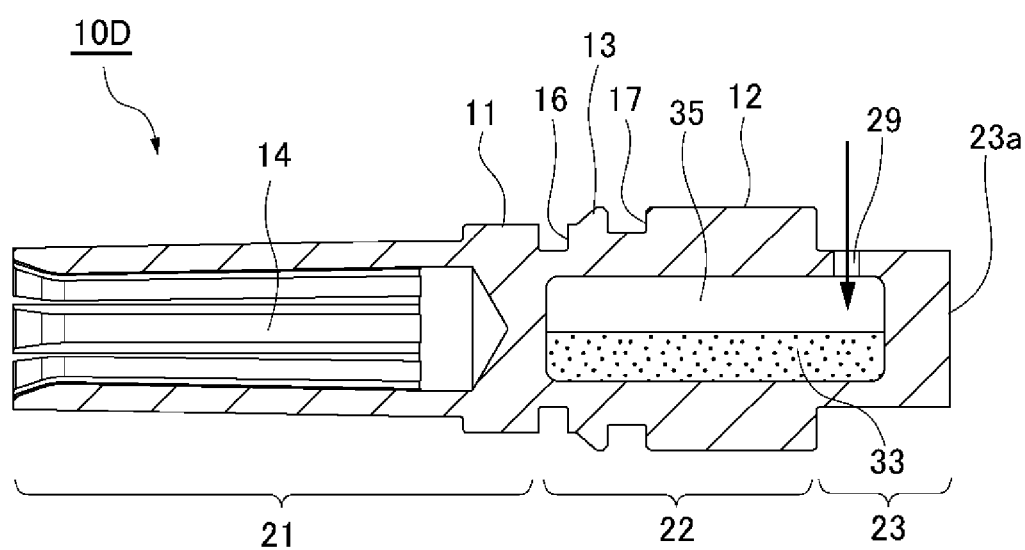
FIG. 12 is a longitudinal sectional view illustrating an operation of filling a latent heat storage material into a sealed space of the quaternary molded product illustrated in FIG. 11.

Next, as illustrated in FIG. 12, the latent heat storage material 33 is filled from the sealing hole 29 into the sealed space 26 of the quaternary molded product 10D (heat storage material filling step). At this time, the sealed space 26 is not full of the latent heat storage material 33 and a part of the space remains and is filled with air that is the gas 35. It is needless to say that a compressible gas such as nitrogen gas may be filled in place of air.

Figure 13:
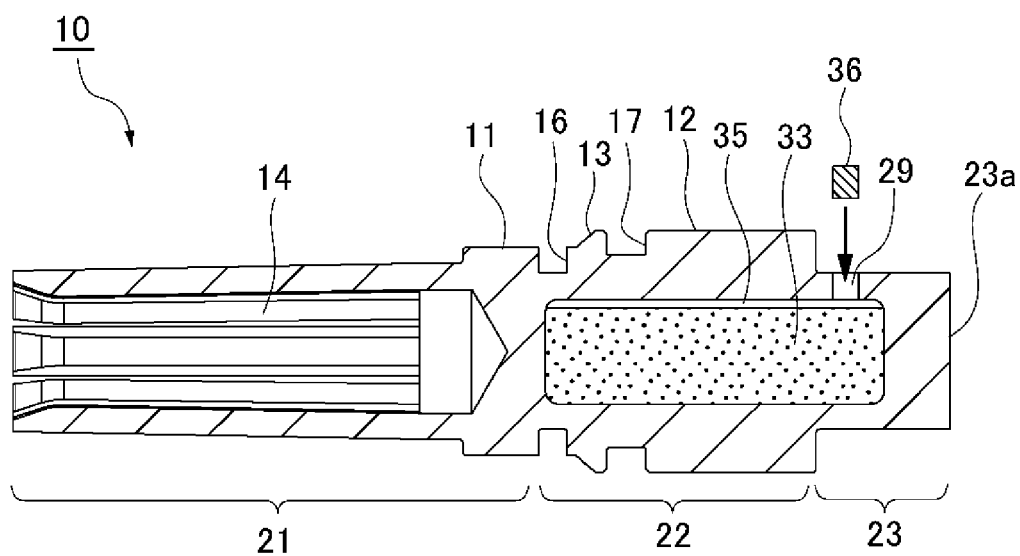
FIG. 13 is a longitudinal sectional view illustrating an operation of sealing the latent heat storage material and a gas in the sealed space of the quaternary molded product illustrated in FIG. 12.

Next, as illustrated in FIG. 13, the sealing hole 29 of the quaternary molded product 10D in which the latent heat storage material 33 and the gas 35 are filled in the sealed space 26 is blocked by the plug member 36 (sealing step for sealing the sealing hole). The plug member 36 can be fixed to the sealing hole 29 by various fixing methods such as press-fitting, screwing, and welding.

Then, the operation of sealing the latent heat storage material 33 and the gas 35 in the sealed space 26 of the quaternary molded product 10D is completed, and the terminal 10 is completed. The terminal 10 constitutes the terminal-equipped electric wire 3 by joining the conductor core wire 2a of the electric wire 2 to the end surface 23a of the electric wire connecting portion 23 by thermal pressure welding.

Next, the operation of the terminal 10 according to the present embodiment described above will be described. When a charging gun is fitted to the charging inlet 1 illustrated in FIG. 1, a charging current is supplied from a charger outside the vehicle to the battery mounted on the vehicle through the charging gun and the charging inlet 1. In particular, when a large charging current is supplied from the charger outside the vehicle to the battery in order to shorten the charging time, heat is likely to be generated at a contact portion between the counterpart, terminal of the charging gun and the terminal 10 of the charging inlet 1.

At this time, in the terminal 10 of the present embodiment, the latent heat storage material 33 and the gas 35 are sealed in the sealed space 26 defined in the holding portion 22. The latent heat storage material 33 can temporarily absorb heat by the latent heat during phase change between liquid and solid. That is, the latent heat storage material 33 absorbs the heat generated in the terminal 10. Accordingly, a rapid temperature rise of the terminal 10 can be prevented. Since the latent heat storage material 33 absorbs the heat, the amount of heat transferred from the terminal 10 to the electric wire 2, the housing 20, and the like can be reduced. For this reason, a rapid temperature rise of the electric wire 2, the housing 20, and the like can also be prevented. The latent heat storage material 33 sealed in the sealed space 26 can obtain a permanent effect and requires no maintenance.

In the terminal 10 of the present embodiment, the sealing hole 29 having a minimum size necessary for filling the latent heat storage material 33 communicates the sealed space 26 defined in the holding portion 22 with the outside of the terminal. The minimum size necessary for filling the latent heat storage material 33 is, for example, such a size that a filling nozzle for filling the sealed space 26 with the latent heat storage material 33 is insertable. The sealing hole 29 can be blocked by the plug member 36 having a minimum size corresponding to the size of the sealing hole 29.

Therefore, in the terminal 10 of the present embodiment, the sealing operation of sealing the latent heat storage material 33 in the sealed space 26 is facilitated as compared with a terminal in the related art in which an opening of a bottomed tubular case body needs to be blocked by the cover and welded.

In the terminal 10 of the present embodiment, the cross-sectional area of the holding portion 22 in which the sealed space 26 is defined is larger than the cross-sectional area of the terminal connecting portion 21. The holding portion 22 in the structure of the terminal 10 is a portion that can ensure a sufficient cross-sectional energization area, and is sufficient to ensure the same heat capacity as the cross-sectional energization area of the terminal connection portion 21. Therefore, even when the sealed space 26 is provided inside the terminal 10 made of a metal such as copper or aluminum, which is a sensible heat storage material, and the cross-sectional energization area is reduced, the thermal influence is slight.

Further, in the terminal 10 of the present embodiment, the first member 24 integrally formed with the terminal connecting portion 21 and the second member 25 integrally formed with the electric wire connecting portion 23 are joined to be integrated with each other, and the first concave portion 27 and the second concave portion 28 that define the sealed space 26 are formed in the joining surface 24b of the first member 24 and the joining surface 25b of the second member 25, respectively. Therefore, it is possible to easily define, in the holding portion 22 of the terminal 10, the sealed space 26 that has airtightness and can withstand a change in the internal pressure.

Further, in the terminal 10 of the present embodiment, the sealing hole 29 is formed in the outer peripheral surface of the second member 25 having a smaller diameter than the large diameter portion 12 of the first member 24. Therefore, the sealing hole 29 communicating with the second concave portion 28 of the second member 25 is a relatively short through hole, which facilitates formation of the sealing hole 29. In addition, the sealing hole 29 is a through hole having a minimum size necessary for filling the latent heat storage material 33, and can be easily drilled.

According to an aspect of the embodiments described above, a connection terminal (for example, terminal 10) includes a terminal connecting portion (21) configured to be electrically connected to a counterpart terminal, an electric wire connecting portion (23) configured to be electrically connected to an electric wire (2), a holding portion (22) provided between the terminal connecting portion (21) and the electric wire connecting portion (23) and configured to be held by a housing (20), a sealed space (26) formed in the holding portion (22), a latent heat storage material (33) and a gas (35) sealed in the sealed space (26), a sealing hole (29) communicating the sealed space (26) with a space outside the connection terminal, and a plug member (36) configured to block the sealing hole (29).

According to the connection terminal having the above described configuration, the latent heat storage material (33) sealed in the sealed space (26) defined in the holding portion (22) temporarily absorbs heat by latent heat during phase change between liquid and solid. Therefore, the latent heat storage material (33) can absorb heat generated in the connection terminal (terminal 10), and can prevent a rapid temperature rise of the connection terminal (terminal 10). The sealing hole (29) having a minimum size (for example, a size into which a filling nozzle for filling the latent heat storage material is insertable) necessary for filling the latent heat storage material (33) communicates the sealed space (26) with the outside of the terminal. The sealing hole 29 can be blocked by the plug member 36 having a minimum size corresponding to that of the sealing hole 29. Therefore, the connection terminal (terminal 10) having the configuration facilitates the sealing operation of sealing the latent heat storage material (33) in the sealed space (26), as compared with a terminal in the related art in which an opening of a bottomed tubular case body needs to be blocked with a cover and be welded.

A cross-sectional area of the holding portion (22) may be larger than a cross-sectional area of the terminal connecting portion (21).

With this configuration, the holding portion (22) in the structure of the connection terminal (terminal 10) can ensure a sufficient cross-sectional energization area, and can ensure the same heat capacity as a cross-sectional energization area of the terminal connecting portion (21). Therefore, even when the sealed space (26) is provided inside the connection terminal (terminal 10) made of a metal such as copper or aluminum, which is a sensible heat storage material, and the cross-sectional energization area is reduced, the thermal influence is slight.

The connection terminal (for example, terminal 10) may be integrally formed by joining a first member (24) integrally formed with the terminal connecting portion (21) and a second member (25) integrally formed with the electric wire connecting portion (23). A first concave portion (27) may be formed in a joining surface (24b) of the first member (24) with the second member (25) and a second concave portion (28) is formed in a joining surface (25b) of the second member (25) with the first member (24). The first concave portion (27) and the second concave portion (28) may together define the sealed space (26).

With this configuration, the sealed space (26) that has airtightness and can withstand a change in internal pressure can be easily defined in the holding portion (22) of the connection terminal (terminal 10).

The second member (25) may have a smaller diameter than the first member (24). The sealing hole (29) may be drilled in an outer peripheral surface of the second member (25).

With this configuration, the sealing hole (29) communicating with the second concave portion (28) of the second member (25) is a relatively short through hole and is easily formed. In addition, the sealing hole (29) is a through hole having a minimum size necessary for filling the latent heat storage material (33) and is easily drilled.

What is claimed is:

1. A connection terminal comprising:
a terminal connecting portion configured to be electrically connected to a counterpart terminal;
an electric wire connecting portion configured to be electrically connected to an electric wire;
a holding portion provided between the terminal connecting portion and the electric wire connecting portion;
a sealed space formed in the holding portion;
a latent heat storage material and a gas sealed in the sealed space;
a sealing hole communicating the sealed space with a space outside the connection terminal; and
a plug member disposed in the sealing hole and configured to block the sealing hole,
wherein the connection terminal comprises a first member integrally formed with the terminal connecting portion and a second member integrally formed with the electric wire connecting portion, the first member and the second member being joined with each other, wherein a first concave portion is formed in a joining surface of the first member with the second member and a second concave portion is formed in a joining surface of the second member with the first member, and wherein the first concave portion and the second concave portion together define the sealed space.

2. The connection terminal according to claim 1, wherein a cross-sectional area of the holding portion is larger than a cross-sectional area of the terminal connecting portion.

3. The connection terminal according to claim 1, wherein the second member has a smaller diameter than the first member, and wherein the sealing hole is a drilled sealing hole, drilled in an outer peripheral surface of the second member.

\* \* \* \* \*